(12) United States Patent
Guo et al.

(10) Patent No.: US 7,715,398 B2
(45) Date of Patent: May 11, 2010

(54) METHOD FOR TRANSMITTING MESSAGE IN A RESILIENT PACKET RING NETWORK

(75) Inventors: Yantao Guo, Shenzhen (CN); Qiupeng Zhao, Shenzhen (CN); Yang He, Shenzhen (CN); Linchun Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 798 days.

(21) Appl. No.: 11/545,685

(22) Filed: Oct. 10, 2006

(65) Prior Publication Data

US 2007/0140248 A1 Jun. 21, 2007

Related U.S. Application Data

(63) Continuation of application No. PCT/CN2005/000592, filed on Apr. 28, 2005.

(51) Int. Cl.
*H04L 12/56* (2006.01)
(52) U.S. Cl. ........................ 370/392; 370/432
(58) Field of Classification Search ................. 370/392, 370/432
See application file for complete search history.

(56) References Cited

U.S. PATENT DOCUMENTS 6,801,496 B1 * 10/2004 Saleh et al. ................. 370/221

| | | | |
|---|---|---|---|
| 2002/0010869 A1 | 1/2002 | Kim | |
| 2003/0012129 A1 * | 1/2003 | Lee et al. | 370/216 |
| 2005/0249233 A1 * | 11/2005 | Akaba et al. | 370/432 |
| 2006/0120279 A1 * | 6/2006 | Mitsumori | 370/218 |

FOREIGN PATENT DOCUMENTS

| | | |
|---|---|---|
| JP | 11252108 | 9/1999 |
| WO | WO01/50706 | 7/2001 |
| WO | WO02/13399 | 2/2002 |
| WO | WO2005/107176 | 11/2005 |

* cited by examiner

*Primary Examiner*—Chi H Pham
*Assistant Examiner*—Albert T Chou
(74) *Attorney, Agent, or Firm*—Finnegan, Henderson, Farabow, Garrett & Dunner LLP

(57) ABSTRACT

A method for transmitting packets in an RPR includes: presetting an MAC table having an item which is a corresponding relationship between the node MAC address and the UE MAC address of each node; an RPR node receiving an insert packet, performing the MAC table lookup, deciding whether an item matching a destination MAC address of the insert packet exists; if there exists the item, converting the insert packet to an extended frame-formatted packet where the RPR destination node MAC address equals to the node MAC address of the item and sending the converted packet to the destination node, and performing the corresponding process; if there does not exist the item, converting the insert packet to an extended frame-formatted packet where the RPR destination node MAC address equals to a broadcast MAC address, broadcasting the converted packet on the whole network, and performing the corresponding process.

11 Claims, 4 Drawing Sheets

METHOD FOR TRANSMITTING MESSAGE IN A RESILIENT PACKET RING NETWORK

CROSS-REFERENCE TO RELATED APPLICATIONS

This application is a continuation of International Application No. PCT/CN2005/000592, filed on Apr. 28, 2005, which claims priority to Chinese Application No. 200410038802.8, filed on Apr. 30, 2004.

FIELD OF THE TECHNOLOGY

The present invention relates to the Resilient Packet Ring (RPR) technology in communication networks, and more specifically, to a method for transmitting packets in a resilient packet ring network.

BACKGROUND OF THE INVENTION

Recently, with the rapid development of data services, the Ethernet technology has been used widely in the Metropolitan Area Networks (MAN), since it has some advantages, such as low cost, simple structure, as well as facilitations of transmitting and processing Internet Protocol (IP) data packets. However, the Ethernet technology can not effectively meet the current requirement of a MAN in the aspects of reliability and expansibility, since it lacks the Quality of Service (QoS) of the telecommunication level and the network management mechanism for fast protection/recovery and integrity. Hence, the RPR technology emerges as required.

RPR is a Multi-Service Transmission Platform (MSTP) technology that transmits services, e.g. data, voice, image, etc, by using the packet technology in a ring network structure. Integrating the intelligence of IP technology, the economical efficiency of the Ethernet and the high bandwidth efficiency as well as reliability of an optical ring network, RPR solves the QoS problems, such as the classification of service, and provides a favorable networking solution for the broadband IP MAN operators.

As shown in FIG. 1, the RPR adopts a dual-ring architecture that is composed of an external ring and an internal ring, wherein the transporting direction of the internal ring is opposite to that of the external ring; hence two transmission paths exist between a pair of nodes. In addition, when all of the nodes in the RPR are Layer3 data communication devices, e.g. Layer3 switches and routers, the packets transmission between the Layer3 devices may be implemented; when all of the nodes in the RPR are Layer2 data communication devices, e.g. Layer2 switches, the packets transmission between the Layer2 devices may be implemented.

In accordance with RPR protocols, the RPR implements communications between Layer2 devices by using the bridge mode. Specifically, the nodes in the RPR convert an insert packet came from a User Equipment (UE) to an extended frame-formatted packet and broadcasts it on the whole network. The nodes that receive the extended frame-formatted packet convert the packet to an Ethernet frame-formatted packet and send the Ethernet frame-formatted packet to the UE connected with it.

As shown in FIG. 2, the method for transporting a packet between Layer2 devices in an existing RPR includes the following steps:

Step 201: A node of the RPR receives an insert packet came from a UE.

Steps 202~203: The nodes that receive the insert packet convert the format of the packet from the Ethernet frame format to the RPR extended frame format, and broadcast the converted packet to the whole network.

Generally, the format of the insert packet received by an RPR node is the Ethernet frame format. However, the packet transported in the RPR must conform to the RPR protocols. Thus, the node that receives the insert packet needs to perform the format conversion for the packet.

In accordance with the RPR protocols, the format of the packet transported in the RPR may be an RPR basic frame format or the RPR extended frame format. The RPR basic frame format is used in an RPR that is composed of Layer3 devices while the RPR extended frame format is used in an RPR that is composed of Layer2 devices. Table 1 shows the specific architecture of the RPR extended frame.

TABLE 1

| Length(Byte) | Field | Indication |
|---|---|---|
| 1 | TTL | Time To Live (TTL), indicates the maximal number of hops and is subtracted 1 each time the packet passes one node in the forwarding process |
| 1 | BaseControl | RPR frame control message |
| 6 | R_Dmac | MAC address of RPR destination node |
| 6 | R_Smac | MAC address of RPR source node |
| 1 | TTLBase | original value of the Maximal number of hops of the RPR frame, remains unchanged in the forwarding process |
| 1 | ExtendedControl | RPR extended frame control field |
| 2 | HEC | Head error check |
| 6 | DmacExtended | Extended destination MAC address, i.e. MAC address of the destination UE, the actual destination MAC address of the Ethernet frame |
| 6 | SmacExtended | Extended source MAC address, i.e. MAC address of the source UE, the MAC address of the UE that initiates the Ethernet frame |
|  | Data | Remaining frame data |
| 4 | FCS | Frame Check Sequence |

A Layer3 device can identify the source IP address and the destination IP address carried in a packet, and need not use the Media Access Control (MAC) address to transmit and receive the packet. Thus the basic frame format used in the RPR that is composed of Layer3 devices does not have the two fields of SmacExtended and DmacExtended, compared with the extended frame format in the table 1.

Herein, when an Ethernet insert packet is converted to an RPR extended frame-formatted packet, the source MAC address carried in the packet is used as the SmacExtended field of the extended frame, the destination MAC address is used as the DmacExtended field of the extended frame, the MAC address of the node receiving the insert packet is used as the R_Smac field, and the broadcast MAC address is used as the R_Dmac field.

Upon completing the conversion of the insert packet from the Ethernet frame format to the extended frame format, the node receiving the insert packet sends out the converted packet by the way of broadcasting on the whole network.

Steps 204~205: The nodes that receive the extended frame-formatted packet convert the format of the received packet to the Ethernet frame format, and determine the way of processing the packet according to the destination MAC address of the packet.

When the extended frame-formatted packet arrives at a node of the RPR, the format of the packet is converted from the extended frame format to the Ethernet frame format. The detailed method includes: removing the HEC field, the R_Dmac field, the R_Smac field and the BaseControl field of the extended frame-formatted packet, and using the MAC address indicated by the DmacExtended field as the destination MAC address of the Ethernet frame-formatted packet.

Then, according to the destination MAC address of the packet, the node receiving the packet checks if itself is connected with the destination UE of the packet or not. If it is connected with the destination UE, the node sends the Ethernet frame-formatted packet towards the UE corresponding to the destination MAC address; otherwise, processes the Ethernet frame-formatted packet according to the network configuration, e.g. discards the packet.

By now, the packet transmission process in the existing RPR network is completed.

As the broadcast mode is used in the packet transmission in the existing RPR networks, i.e. the extended frame-formatted packet, after being inserted in the ring from the source node, is respectively sent to the other nodes in the RPR except for the source node, the ring paths between the source node and the other nodes of the RPR are largely used, thereby occupying larger bandwidth and requiring more communication resources.

SUMMARY OF THE INVENTION

The invention provides a method for transmitting packets in an RPR network to save communication resources. The method includes the following steps:

In each RPR node, pre-set a relationship between a node MAC address of an RPR node and a User Equipment (UE) MAC address of UE connecting with the RPR node. An RPR node receives an insert packet and decides whether the UE MAC address matches the destination MAC address of the insert packet.

If the UE MAC address matches the destination MAC address of the insert packet, the RPR node converts the insert packet to an extended frame-formatted packet in which an RPR destination node MAC address field of the extended frame-formatted packet is set to the node MAC address corresponding to the matching UE MAC address and sends the converted packet to a destination node corresponding to the RPR destination node MAC address field of the extended frame-formatted packet. The destination node converts the received extended frame-formatted packet to an Ethernet frame-formatted packet and processes the Ethernet frame-formatted packet according to a destination MAC address of the Ethernet frame-formatted packet.

However, if the UE MAC address does not match the destination MAC address of the insert packet, the RPR node converts the insert packet to an extended frame-formatted packet in which the RPR destination node MAC address field of the extended frame-formatted packet is set to a broadcast MAC address and broadcasts the converted packet on the whole network. The node that receives the insert packet converts the received extended frame-formatted packet to an Ethernet frame-formatted packet and processes the Ethernet frame-formatted packet according to the destination MAC address of the Ethernet frame-formatted packet.

According to the invention, in each node of the RPR, preset a relationship, which represents the corresponding relationship between the MAC address of an RPR node and the MAC address of UE connected to the node. Thus, when converting the format of the insert packet to the extended frame format, the node can determine the destination node of the packet according to the destination MAC address of the insert packet. As such, the probability for broadcasting on the RPR nodes is greatly reduced, thereby decreasing the occupied bandwidth for transmitting packets and the required communication resources.

In case of a matching item being find in the MAC table, the converted packet is directly sent to the destination node, which makes multiple nodes in ring can simultaneously transmit packets in the different sections and takes full advantage of the characteristic of space multiplexing of the RPR.

Upon receiving the insert packet, the node of the RPR determines whether the insert packet is from a Layer2 device or a Layer3 device according to the source MAC address of the packet and the MAC address of the node, hence determines whether the format of the insert packet shall be converted to an extended frame format or a basic frame format. Thus, packets may be transported not only in the RPR with Layer2 devices or with Layer3 devices, but also in the RPR with the mixture of the Layer2 devices and the layer3 devices.

Furthermore, this invention may be implemented only by performing a few modifications on the existing RPR protocol, which is beneficial to upgrade the original system, and is easy to implement.

DETAILED DESCRIPTION OF THE INVENTION

The present invention is hereinafter described in detail with reference to the accompanying drawings and the embodiments.

The method for transmitting packets in an RPR network in the embodiments of the invention is implemented as follows. An MAC table is preset. The corresponding relationship between the MAC address of all the nodes of the RPR and the MAC address of UEs of per node is stored in the MAC table. The node receiving an insert packet uses the destination MAC address of the packet as an index to look up the MAC table. If an item matches the destination MAC address of the packet, the node converts the format of the insert packet to the extended frame format and sends out the packet according to the node MAC address of the item, otherwise, converts the format of the insert packet to the extended frame format and sends out the packet by the way of broadcasting on the whole network. The node receiving the sent packet converts the format of the received packet to the Ethernet frame format and decides the method for processing the packet according to the destination MAC address of the Ethernet frame-formatted packet.

The embodiments of the invention are described hereinafter.

In an embodiment of the invention, the MAC table exists in each node of the RPR. The structure of the MAC table is shown in Table 2.

TABLE 2

| aging refreshing identifier | node MAC address | UE MAC address | other related messages |
|---|---|---|---|

In the MAC table of this embodiment, the aging refreshing identifier of the item indicates whether the item is valid. For example, when the identifier is True, the item is valid; while when the identifier is False, the item is invalid. The node MAC address of the item includes the MAC address of each node in the RPR. The UE MAC address of the item includes the MAC address of UE connected with the node that corresponds with an MAC address in the node MAC address of the item. Other related messages of the item includes other key messages e.g. a virtual local area network identifier (vlan_id), etc, except for the destination MAC address carried by the insert packet. In addition, when the item has not been visited within a predetermined period, the aging refreshing identifier in the item is set invalid.

Figure 1:
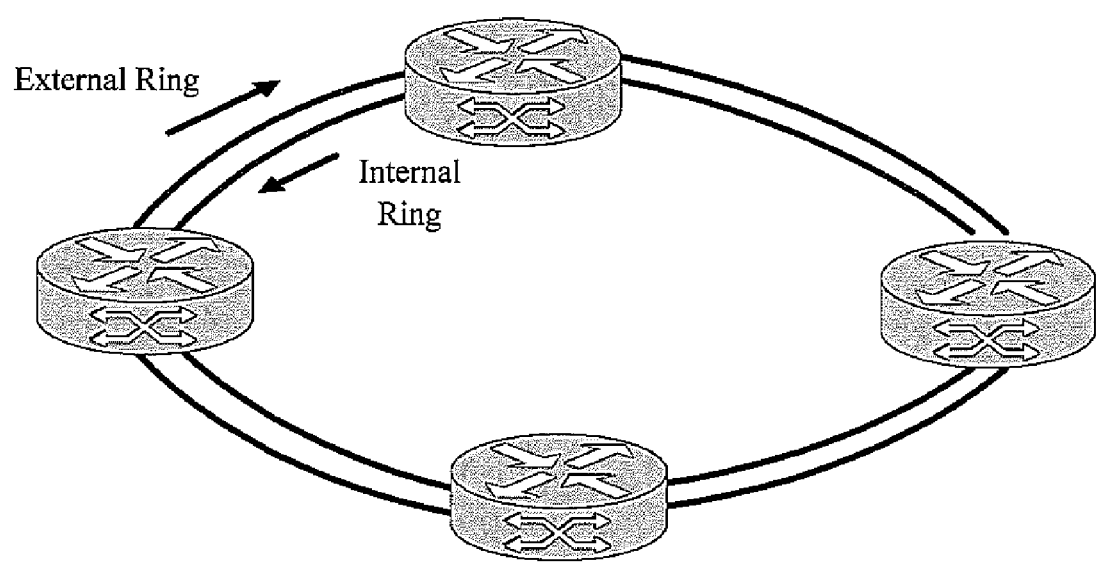
FIG. 1 is a diagram illustrating the architecture of an RPR network.
Figure 2:
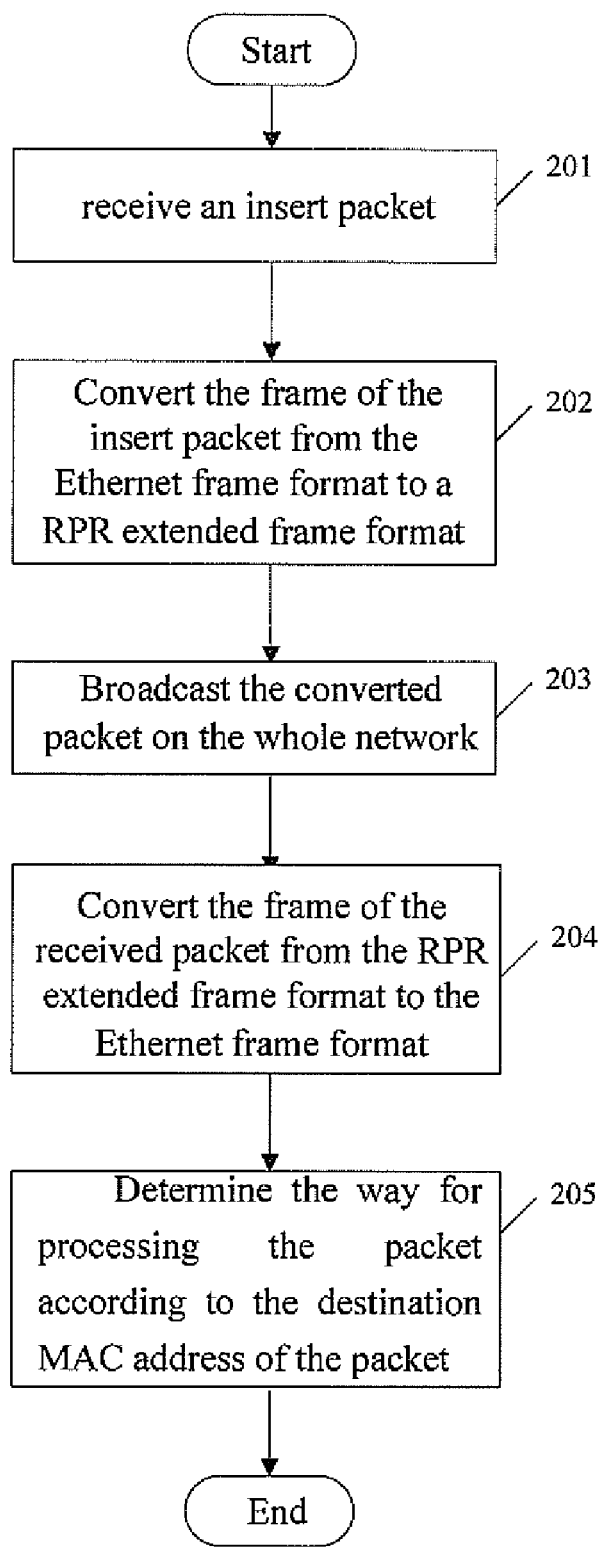
FIG. 2 is a flowchart illustrating the method for transmitting packets in the existing RPR network.
Figure 3:
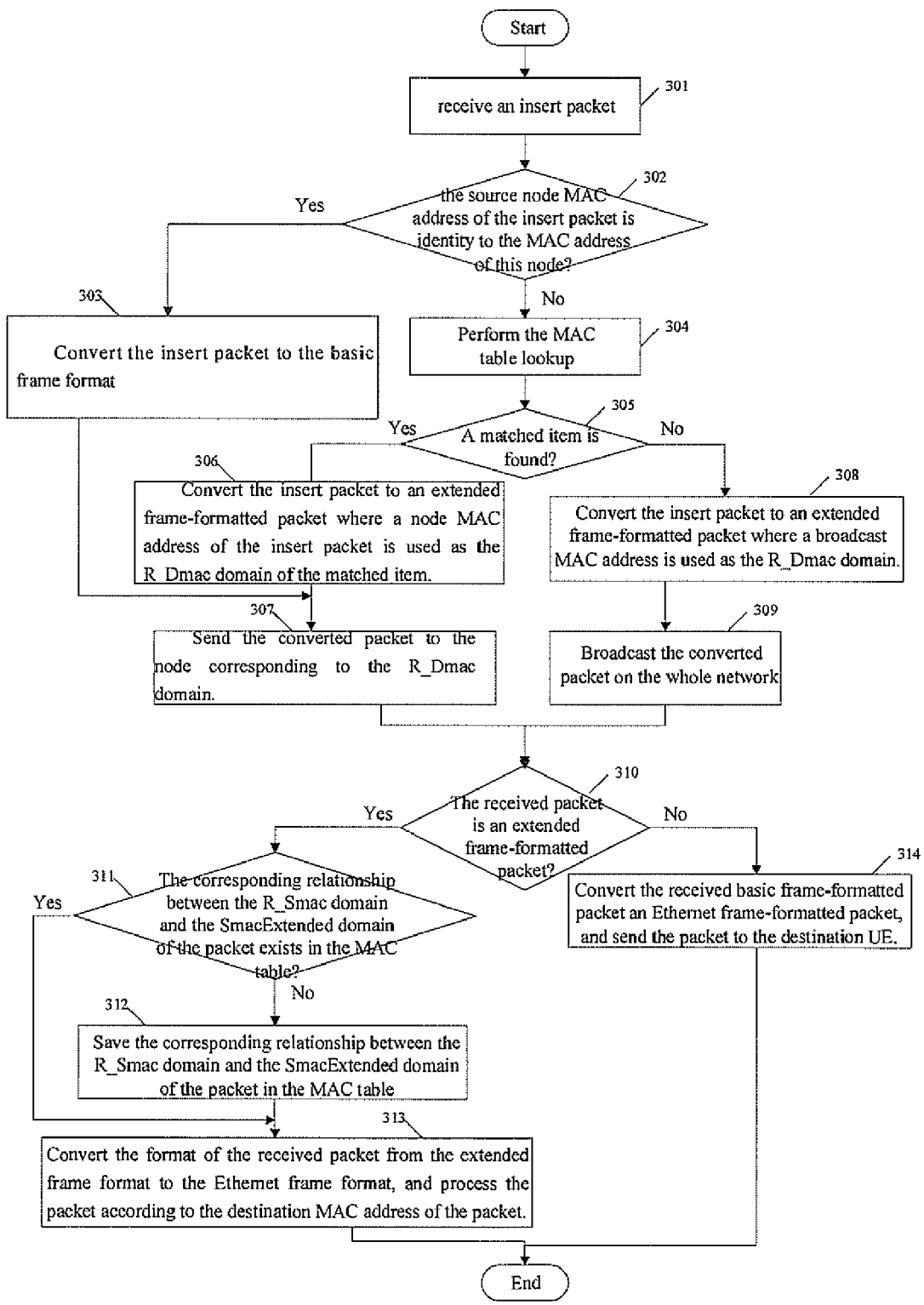
FIG. 3 is a flowchart illustrating the method for transmitting packets in the RPR network according to an embodiment of this invention.

As shown in FIG. 3, the method for transmitting packets in the RPR in accordance with an embodiment of the invention includes the following steps:

Step 301: A node of the RPR receives an insert packet from the UE.

Steps 302~303: The node checks if the source node address carried in the insert packet is identical to the MAC address of the node receiving the insert packet. If the two MAC addresses are the same, the format of the insert packet is converted to the basic frame format, wherein the source node MAC address of the insert packet is used as the R_Smac field of the basic frame-formatted packet and the destination node MAC address of the insert packet is used as the R_Dmac field of the basic frame-formatted packet, and then Step 307 is performed. Otherwise, Step 304 is performed.

Herein, when the source node MAC address of the insert packet is the same as the MAC address of the node receiving the insert packet, it is indicated that the insert packet comes from a Layer3 device; otherwise, it is indicated that the insert packet comes from a Layer2 device.

Steps 304~305: By using the destination MAC address of the insert packet as an index, the MAC table of this node is searched. If a matching item is found, Step 306 is performed; otherwise, Step 308 is performed.

Herein, the method for finding the item which matches a destination MAC address of the insert packet includes the following steps:

Read from the head item of the MAC table, and take the read item as the current item.

Check if the aging refreshing identifier of the current item is valid or not.

If the aging refreshing identifier of the current item is valid, decide whether the destination address carried in the insert packet is the same as the UE MAC address of the current item. If the two addresses are identical, decide whether the node MAC address of the current item is the same as the destination node MAC address carried in the insert packet. Otherwise, decide whether the current item is the tail item of the MAC table.

If the node MAC address of the current item is the same as the MAC address of the node that receives the insert packet, determine that a matching item exists and terminate the lookup process, otherwise, decide whether the current item is the tail item of the MAC table.

If the current item is the tail item of the MAC table, determine that no matching item exists and terminate the lookup process. Otherwise, turn to the next item of the MAC table.

Steps 306~307: Convert the insert packet to the extended frame-formatted packet in which the R_Dmac field of the extended frame-formatted packet is set to the node MAC address of the found table, send the converted packet to the node corresponding to the R_Dmac field, and then perform Step 310.

Herein, in case that a matching item is found in Step 305, the node MAC address of the item is used as the R_Dmac field of the extended frame. In addition, similar to the existing method of the extended frame format conversion, the source MAC address carried by the insert packet is used as the SmacExtended field of the extended frame, the destination MAC address is used as the DmacExtended field of the extended frame, and the MAC address of the node that receives the insert packet is used as the R_Smac field. As such, the insert packet is converted to the extended frame-formatted packet.

Upon completing the conversion, the node receiving the insert packet sends the converted packet to the node corresponding to the R_Dmac field, i.e. the destination node of the packet.

Steps 308~309: Convert the insert packet to the extended frame-formatted packet in which the R_Dmac field is set to the broadcast MAC address, broadcast the converted packet on the whole network, and then perform Step 310.

In case that the table item matching the destination MAC address of the insert packet is not found in Step 305, the destination node of the insert packet can not be decided. Therefore, the insert packet is sent out in the way of broadcast.

Step 310: According to the value of the bit indicating the frame type of the packet carried in the RPR frame header of the received packet, decide whether the format of the packet is the extended frame format. If the format of the packet is the extended frame, Step 311 is performed; otherwise, Step 314 is performed.

In accordance with the RPR protocols, both in the extended frame-formatted RPR packet and in the basic frame-formatted RPR packet, the 7th bit in the ExtendedControl field indicates the frame type of the packet. When the value of the 7th bit is 0, a basic frame-formatted packet is indicated; when the value of the 7th bit is 1, an extended frame-formatted packet is indicated.

Steps 311~312: Decide whether a corresponding relationship between the R_Smac field and the SmacExtended field of the packet exists in the MAC table that is located in the node receiving the extended frame-formatted packet. If there is a corresponding relationship, Step 313 is performed; otherwise, the corresponding relationship between the R_Smac field and the SmacExtended field of the packet is stored in the MAC table of this node.

Herein, the method of storing the corresponding relationship between the R_Smac field and the SmacExtended field of the packet in the MAC table of this node includes: creating an item in the MAC table of the node that receives the packet, setting the node MAC address of the item to the content of the R_Smac field of the packet, setting the UE MAC address of the item to the content of the SmacExtended field, and setting other related messages of the item to the other corresponding information of the packet. Thus, when an insert packet appears in the node, the probability of finding an item that matches the destination MAC address of the insert packet may be continuously enhanced.

Step 313: The received extended frame-formatted packet is converted to an Ethernet frame-formatted copy packet. According to the destination MAC address in the copy packet, the processing method of the copy packet is decided.

In this step, the method of converting the format of the packet to the Ethernet frame format is the same as the existing method, i.e. the HEC field, the R_Dmac field, the R_Smac field and the BaseControl field of the extended frame-formatted packet are removed, and the MAC address indicated by the DmacExtended field in the extended frame-formatted packet is used as the destination MAC address of the Ethernet frame-formatted packet.

Then, the node receiving the packet decides, according to the destination MAC address of the packet, whether the destination UE of the packet connects with it. If it does, the Ethernet frame-formatted packet is sent to the UE corresponding to the destination MAC address, otherwise, the Ethernet frame-formatted packet is processed according to the network configuration, e.g. the Ethernet frame-formatted packet is discarded and etc.

Step 314: The received basic frame-formatted packet is converted to the Ethernet frame-formatted copy packet, and the Ethernet frame-formatted copy packet is sent to the destination UE.

In this step, the HEC field, the R_Dmac field, the R_Smac field and the BaseControl field of the basic frame-formatted packet are removed firstly, and the MAC address of the node receiving the basic frame-formatted packet is used as the destination MAC address of the Ethernet frame-formatted copy packet. Then the copy packet is sent to the destination UE according to the information, such as IP address carried in the data field of the copy packet.

By now, the packet transmission process in the RPR network of this embodiment is implemented.

Figure 4:
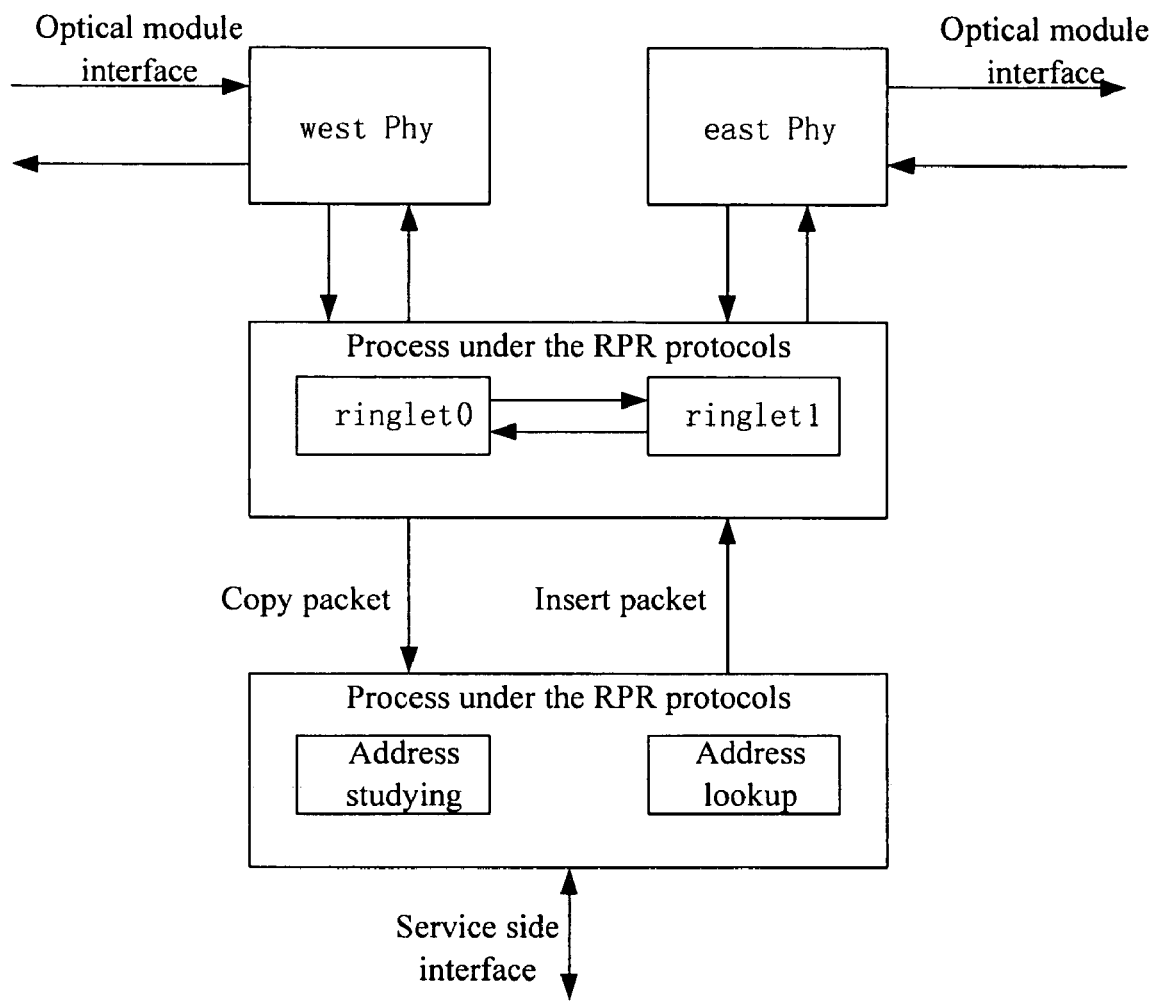
FIG. 4 is a block diagram illustrating the logic of the RPR nodes according to an embodiment of this invention.

In terms of the nodes in the RPR shown in FIG. 4, a west Phy and an east Phy serve to receive and send the packet. When the insert packet is received, the MAC table lookup is performed by an address lookup module. When the copy packet is received, the corresponding relationship between the R_Smac field and the SmacExtended field of the packet is stored in the MAC table by an address studying module.

The foregoing is only the preferred embodiment of this invention and is not for use in limiting this invention. The invention is to cover all the modifications, variations and equivalent replacements within the spirit and scope of the disclosure as defined by the appended claims.

What is claimed is:

1. A method for transmitting a packet in a Resilient Packet Ring (RPR) network, comprising:
   in each RPR node, pre-setting a relationship between a node MAC address of an RPR node and a User Equipment (UE) MAC address of UE connecting with the RPR node;
   an RPR node receiving an insert packet and deciding whether the UE MAC address matches a destination MAC address of the insert packet;
   if the UE MAC address matches the destination MAC address of the insert packet, deciding whether the node MAC address of the current item is the same as the destination node MAC address carried in the insert packet, converting the insert packet to an extended frame-formatted packet in which an RPR destination node MAC address field of the extended frame-formatted packet is set to the node MAC address corresponding to the matching UE MAC address, sending the extended frame-formatted packet to a destination node corresponding to the RPR destination node MAC address field of the extended frame-formatted packet, and
   the destination node converting the received extended frame-formatted packet to an Ethernet frame-formatted packet and processing the Ethernet frame-formatted packet according to a destination MAC address of the Ethernet frame-formatted packet; and
   if the UE MAC address does not match the destination MAC address of the insert packet, converting the insert packet to an extended frame-formatted packet in which the RPR destination node MAC address field of the extended frame-formatted packet is set to a broadcast MAC address, broadcasting the converted packet on the whole network, and
   the node that receives the insert packet, converting the received extended frame-formatted packet to an Ethernet frame-formatted packet and processing the Ethernet frame-formatted packet according to the destination MAC address of the Ethernet frame-formatted packet.

2. The method according to claim 1, wherein the node MAC address of the RPR node and the UE MAC address of UE connecting with the RPR node are contained in a MAC table; the process of deciding whether the UE MAC address matches the destination MAC address of the insert packet comprises: using a destination MAC address of the insert packet as an index to perform a lookup in the MAC table.

3. The method according to claim 2, wherein the MAC table comprises items, each of which includes the node MAC address of the RPR node and the UE MAC address of UE connecting with the RPR node, and each item further comprises an aging refreshing identifier for indicating a validity of the item; the process of performing the lookup on the MAC table and deciding whether the UE MAC address in the MAC table matches the destination MAC address of the insert packet comprises:
   reading from the head item of the MAC table, and taking the read item as the current item;
   checking whether the aging refreshing identifier of the current item is valid;
   if the aging refreshing identifier of the current item is valid, deciding whether the destination MAC address carried in the insert packet is the same as the UE MAC address of the current item; if the two addresses are identical, deciding whether the node MAC address of the current item is the same as the destination node MAC address carried in the insert packet; otherwise, deciding whether the current item is the tail item of the MAC table;
   if the node MAC address of the current item is the same as the destination node MAC address carried in the insert packet, determining that the matching UE MAC address of the MAC table exists and terminating the lookup process; otherwise, deciding whether the current item is the tail item of the MAC table; and
   if the current item is the tail item of the MAC table, determining that no matching UE MAC address in the MAC table exists and terminating the lookup process; otherwise, turning to the next item of the MAC table.

4. The method according to claim 1, wherein the process of converting the insert packet to an extended frame-formatted packet in which the RPR destination node MAC address field is set to the node MAC address corresponding to the matching UE MAC address comprises:
   setting a SmacExtended field of the extended frame to a source MAC address of the insert packet, setting a DmacExtended field of the extended frame to the destination MAC address of the insert packet, setting a R_Smac field to the node MAC address of the node receiving the insert packet, and setting a R_Dmac field to the node MAC address corresponding to the matching UE MAC address;
   the process of sending the converted packet to the destination node corresponding to the RPR destination node MAC address comprises: the node that receives the insert packet sending the converted packet to the node corresponding to the R_Dmac field of the packet.

5. The method according to claim 1, wherein the process of converting the insert packet to an extended frame-formatted packet in which the RPR destination node MAC address is set to a broadcast MAC address comprises:

setting a SmacExtended field of the extended frame to the source MAC address of the insert packet, setting a DmacExtended field of the extended frame to the destination MAC address of the insert packet, setting a R_Smac field to the MAC address of the node receiving the insert packet, and setting a R_Dmac field to the broadcast MAC address.

6. The method according to claim 1, wherein the process of converting the received extended frame-formatted packet to an Ethernet frame-formatted packet comprises:

removing a HEC field, a R_Dmac field, a R_Smac field and a BaseControl field of the extended frame-formatted packet, setting the destination MAC address of the Ethernet frame-formatted packet to the MAC address indicated by a DmacExtended field of the extended frame-formatted packet;

the process of processing the Ethernet frame-formatted packet according to the destination MAC address of the Ethernet frame-formatted packet comprises:

according to the destination MAC address of the Ethernet frame-formatted packet, the node that receives the extended frame-formatted packet deciding whether it connects with a destination UE of the Ethernet frame-formatted packet; if the node that receives the extended frame-formatted packet connects with a destination UE of the Ethernet frame-formatted packet, sending the Ethernet frame-formatted packet towards the UE corresponding to the destination MAC address; otherwise, processing the Ethernet frame-formatted packet according to the network configuration.

7. The method according to claim 1, upon receiving the insert packet and before deciding whether the UE MAC address matches the destination MAC address of the insert packet, further comprising:

deciding whether the source node address of the insert packet is the same as the node MAC address of the node receiving the insert packet; if the source node address is the same as the node MAC address of the node receiving the insert packet, converting the insert packet to a basic frame-formatted packet in which a R_Smac field of the basic frame-formatted packet is set to the source node MAC address of the insert packet and a R_Dmac field of the basic frame-formatted packet is set to the destination node MAC address of the insert packet, and sending the converted packet to the destination node; if the source node address is not identical to the node MAC address of the node receiving the insert packet, deciding whether the UE MAC address matches the destination MAC address of the insert packet.

8. The method according to claim 1 before the process of converting the received extended frame-formatted packet to an Ethernet frame-formatted packet and processing the Ethernet frame-formatted packet according to the destination MAC address of the Ethernet frame-formatted packet, further comprising:

according to the value of the bit indicating the frame type of the packet carried by an RPR frame header of the received packet, deciding whether the received packet is an extended frame-formatted packet, if the received packet is an extended frame-formatted packet, converting the received extended frame-formatted packet to an Ethernet frame-formatted packet and processing the Ethernet frame-formatted packet according to the destination MAC address of the Ethernet frame-formatted packet; if the received packet is not an extended frame-formatted packet, converting the received basic frame-formatted packet to an Ethernet frame-formatted packet and sending the Ethernet frame-formatted packet to the destination UE.

9. The method according to claim 6, before the process of converting the received extended frame-formatted packet to an Ethernet frame-formatted packet and processing the Ethernet frame-formatted packet according to the destination MAC address of the Ethernet frame-formatted packet, further comprising:

according to the value of the bit indicating the frame type of the packet carried by an RPR frame header of the received packet, deciding whether the received packet is an extended frame-formatted packet, if the received packet is an extended frame-formatted packet, converting the received extended frame-formatted packet to an Ethernet frame-formatted packet and processing the Ethernet frame-formatted packet according to the destination MAC address of the Ethernet frame-formatted packet; if the received packet is not an extended frame-formatted packet, converting the received basic frame-formatted packet to an Ethernet frame-formatted packet and sending the Ethernet frame-formatted packet to the destination UE.

10. The method according to claim 2, before the process of converting the received extended frame-formatted packet to an Ethernet frame-formatted packet and processing the Ethernet frame-formatted packet according to the destination MAC address of the Ethernet frame-formatted packet, further comprising:

deciding whether a corresponding relationship between a R_Smac field and a SmacExtended field of the extended frame-formatted packet exists in the MAC table located in the node that receives the extended frame-formatted packet; if there exists the corresponding relationship, converting the received extended frame-formatted packet to an Ethernet frame-formatted packet and processing the Ethernet frame-formatted packet according to the destination MAC address of the Ethernet frame-formatted packet; if there does not exist the corresponding relationship, storing the corresponding relationship in the MAC table.

11. The method according to claim 10, wherein the process of storing the corresponding relationship in the MAC table comprises:

creating an item in the MAC table of the node that receives the packet, setting the node MAC address of the item to the content of the R_Smac field of the packet and selling the UE MAC address of the item to the content of the SmacExtended field of the packet.

* * * * *